(12) United States Patent
Inoue

(10) Patent No.: US 10,650,197 B2
(45) Date of Patent: May 12, 2020

(54) MAGNETIC INFORMATION PROCESSING APPARATUS AND METHOD

(71) Applicant: TOSHIBA TEC KABUSHIKI KAISHA, Tokyo (JP)

(72) Inventor: Yoshimasa Inoue, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 15/905,761

(22) Filed: Feb. 26, 2018

(65) Prior Publication Data

US 2018/0260589 A1    Sep. 13, 2018

(30) Foreign Application Priority Data

Mar. 7, 2017  (JP) .................................. 2017-042910

(51) Int. Cl.
*G06K 7/08* (2006.01)
*G06K 1/12* (2006.01)
(Continued)

(52) U.S. Cl.
CPC .............. *G06K 7/087* (2013.01); *G06K 1/125* (2013.01); *G06K 7/084* (2013.01); *G06K 13/16* (2013.01);
(Continued)

(58) Field of Classification Search
CPC ........ G06K 1/125; G06K 7/084; G06K 7/087; G06K 13/16; G06K 17/00; G07F 19/20
See application file for complete search history.

(56) References Cited

U.S. PATENT DOCUMENTS 3,508,032 A * 4/1970 MacDuffee .............. B41J 11/46
                                                      360/2
3,641,317 A * 2/1972 Cortona .................. G06F 15/10
                                                      360/2
(Continued)

FOREIGN PATENT DOCUMENTS

DE    102005021759 A1    9/2006
GB         2229677 A  * 10/1990    .............. B41J 3/283
(Continued)

OTHER PUBLICATIONS

Extended European Search Report dated Aug. 2, 2018, filed in counterpart European Patent Application No. 18153231.8, 8 pages.

*Primary Examiner* — Thien M Le
*Assistant Examiner* — April A Taylor
(74) *Attorney, Agent, or Firm* — Kim & Stewart LLP

(57) ABSTRACT

A magnetic information processing apparatus for registering transaction information on a line in a document and storing the location of the line in magnetic media attached to the document, includes a magnetic head, a document receptacle configured to receive the document on which the magnetic media storing the position where the immediately previous transaction information is registered is attached, and a processing unit. The processing unit is programmed to control the magnetic head to read information from a first position of the magnetic media, move to a second position of the magnetic media, and read additional information from the second position of the magnetic media, extract registration position information indicating the location of the most recent previous registration position from the result of reading of the first and second positions of the magnetic media by the magnetic head, and output the extracted registration position information.

18 Claims, 5 Drawing Sheets

(51) Int. Cl.
  *G06K 17/00* (2006.01)
  *G06K 13/16* (2006.01)
  *G06Q 20/10* (2012.01)
  *G07F 19/00* (2006.01)
  *B41J 3/28* (2006.01)

(52) U.S. Cl.
  CPC ......... *G06K 17/00* (2013.01); *G06Q 20/1085* (2013.01); *G07F 19/20* (2013.01); *B41J 3/283* (2013.01)

(56) References Cited

U.S. PATENT DOCUMENTS

| | | | |
|---|---|---|---|
| 4,054,198 A | | 10/1977 | Kwan |
| 4,166,945 A | | 9/1979 | Inoyama et al. |
| 4,589,143 A | * | 5/1986 | Baur ............ B41J 3/50 235/432 |
| 5,040,908 A | | 8/1991 | Matsuya et al. |
| 5,873,664 A | * | 2/1999 | Umemo ............ B41J 13/0018 271/236 |

FOREIGN PATENT DOCUMENTS

| | | |
|---|---|---|
| JP | H09-259328 A | 10/1997 |
| JP | 2007-128461 A | 5/2007 |
| WO | 9839747 A1 | 9/1998 |

* cited by examiner

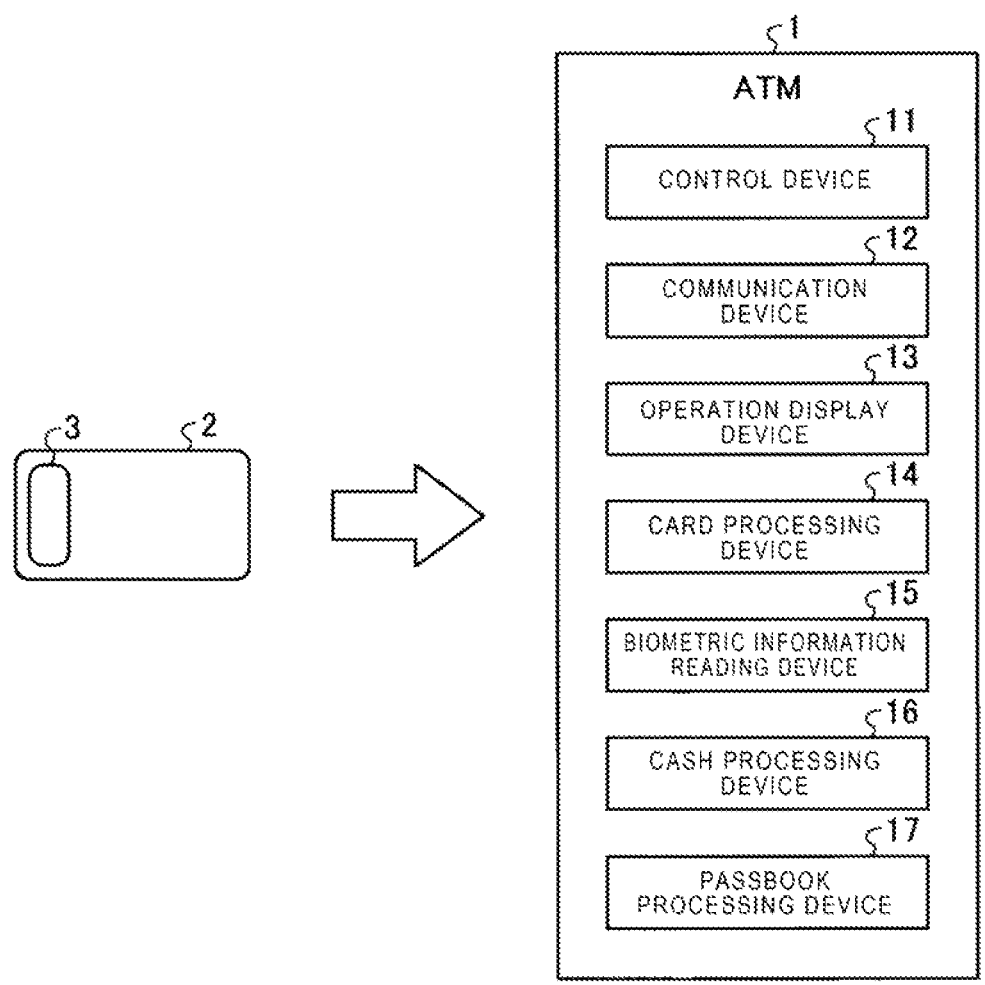

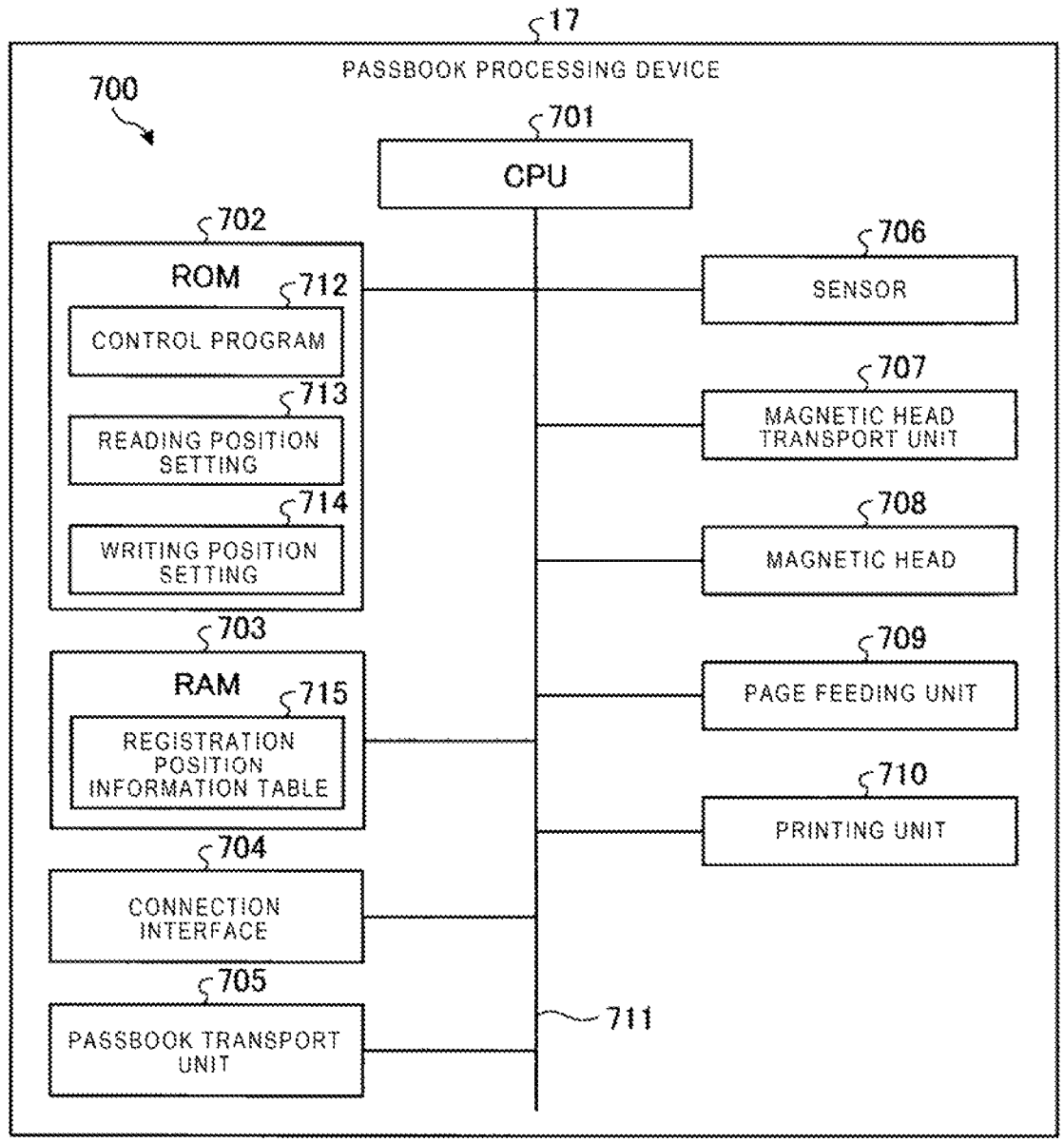

FIG. 6
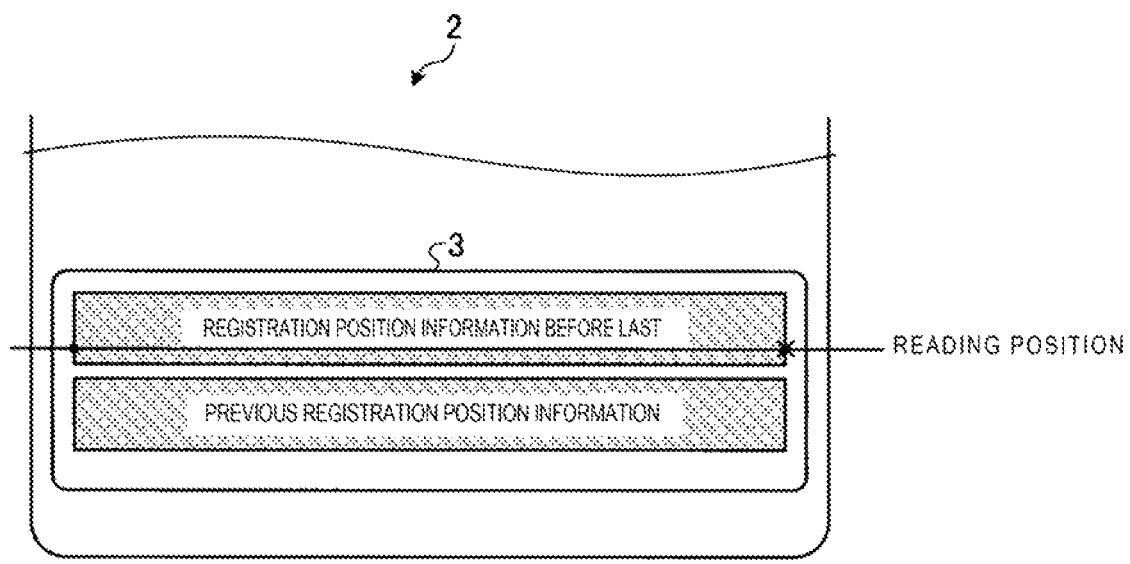
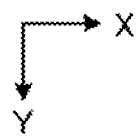
FIG. 7
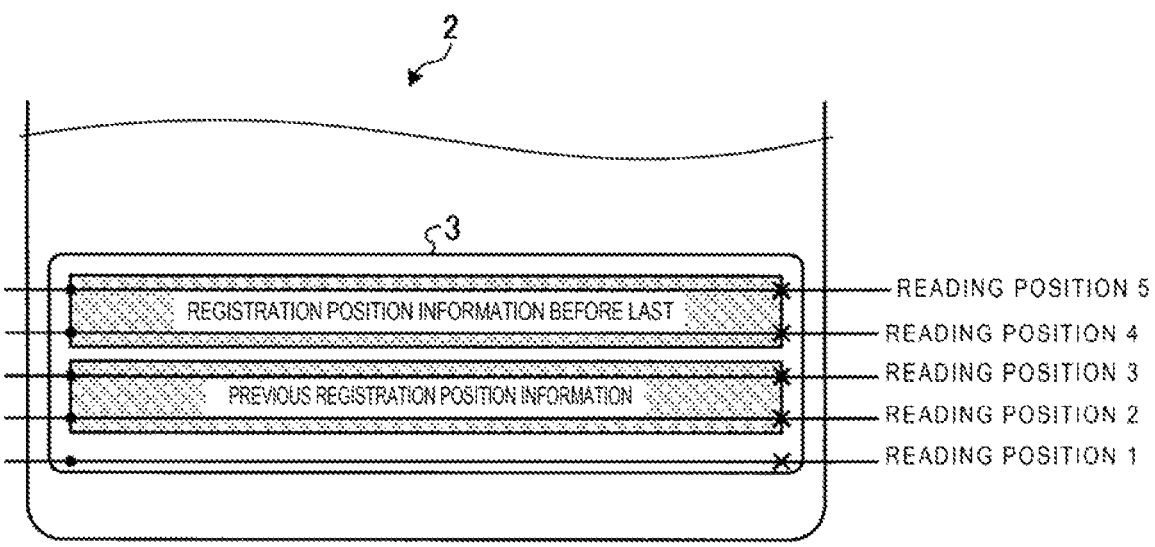
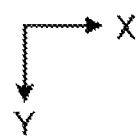

US 10,650,197 B2

MAGNETIC INFORMATION PROCESSING APPARATUS AND METHOD

CROSS-REFERENCE TO RELATED APPLICATION

This application is based upon and claims the benefit of priority from Japanese Patent Application No. 2017-042910, filed Mar. 7, 2017, the entire contents of which are incorporated herein by reference.

FIELD

Embodiments described herein relate generally to a magnetic information processing apparatus and a magnetic information processing method.

BACKGROUND

In the related art, automated teller machines (ATMs) are installed in banks, convenience stores, and the like. The ATMs can register, i.e., record amounts of payments and the current balance amounts of deposits on or in passbooks.

In passbooks, magnetic stripes for storing the positions in the passbook where payment and balance registrations have been located are provided on covers or the like. ATMs read previous registration positions from predetermined positions on the magnetic stripes before performing a new payment or balance registration. Then, the ATMs register, i.e., print, user readable lines of registration information into the passbook. Further, the ATMs update, in the magnetic stripe, the registration positions of the new registration information printed on the passbook by overwriting the registration positions of the new registration information at predetermined positions on the magnetic stripes. In this way, the ATMs can prevent printing of multiple registration information in the same lines of the passbook.

However, the ATMs register the registration positions of printed registration information at positions deviating from the predetermined positions on the magnetic stripes in some cases. In such a case, the registration positions before those last stored at the predetermined positions on the magnetic stripes and the previous registration positions stored at the positions deviating from the predetermined positions coexist, thus resulting in improper updating of the registration positions on the magnetic stripe. Accordingly, the ATMs may read the registration positions previous to the last written when the ATMs access predetermined positions on the magnetic stripes for a subsequent registration. Therefore, multiple registrations occur at the previous registration positions.

DESCRIPTION OF THE DRAWINGS

FIG. 1 is an explanatory diagram illustrating an example of each device included in an ATM according to an embodiment.

FIG. 2 is a block diagram illustrating an example of a hardware configuration of a passbook processing device.

FIG. 3 is an explanatory diagram illustrating an example of a data configuration of a registration position information table.

FIG. 6 is an explanatory diagram illustrating reading of a magnetic stripe of the related art.

FIG. 7 is an explanatory diagram illustrating reading of a magnetic stripe according to the embodiment.

DETAILED DESCRIPTION

Figure 4:
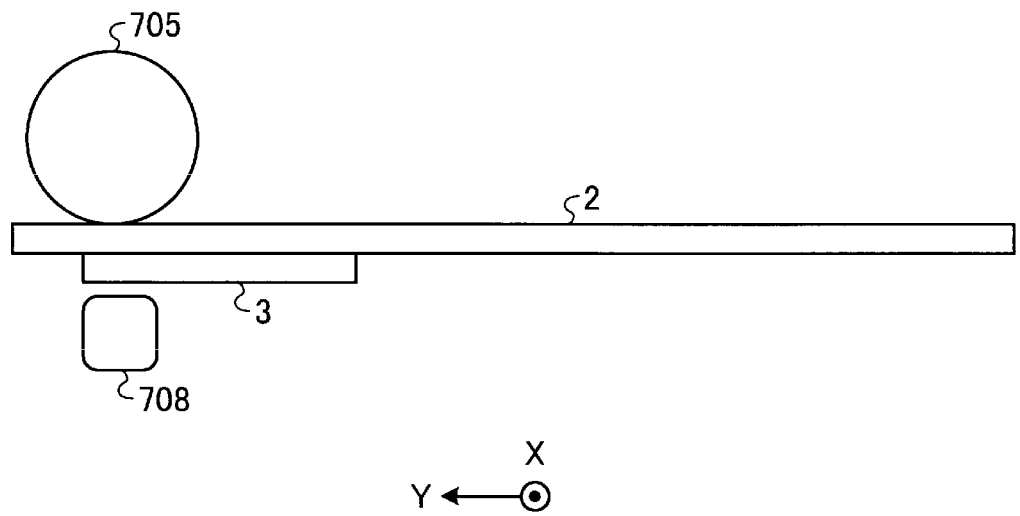
FIG. 4 is an explanatory diagram schematically illustrating an overall structure of the passbook processing device.

Embodiments provide a magnetic information processing apparatus and a magnetic information processing method capable of preventing registration at a wrong position on or in a registration region of a document such as a bank account passbook.

A magnetic information processing apparatus according to an embodiment registers transaction information on a line in a document and stores the location of the line in magnetic media attached to the document. The magnetic information processing apparatus includes a magnetic head, a document receptacle configured to receive the document on which the magnetic media storing the position where the immediately previous transaction information is registered is attached, and a processing unit. The processing unit is programmed to control the magnetic head to read information from a first position of the magnetic media, move to a second position of the magnetic media, and read additional information from the second position of the magnetic media, extract registration position information indicating the location of the most recent previous registration position from the result of reading of the first and second positions of the magnetic media by the magnetic head, and output the extracted registration position information.

Hereinafter, a magnetic information processing apparatus and a program according to an embodiment will be described in detail with reference the drawings. The embodiment to be described below is an embodiment of the magnetic information processing device and a program for operation thereof and it does not limit a configuration, specification, or the like of the magnetic information processing apparatus or program. The embodiment is an application example of an automated teller machine (ATM) installed in a bank or the like and the use thereof in conjunction with a bank customers passbook.

FIG. 1 is an explanatory diagram illustrating an example of each device included in an ATM 1 according to an embodiment. The ATM 1 is an apparatus that executes depositing of cash, withdrawing of cash, or registering transaction information such as payments or deposits with respect to an account on or in a passbook 2. The passbook 2 is a book on which a transaction history related to an account, such as the depositing or withdrawal of cash, is printed. The passbook 2 has a magnetic stripe 3 in which various kinds of information are stored in a magnetic band or line of the magnetic stripe. The magnetic stripe 3 stores registration position information indicating a position where transaction information is registered, i.e., printed, on the passbook 2.

The ATM 1 includes a control device 11, a communication device 12, an operation display device 13, a card processing device 14, a biometric information reading device 15, a cash processing device 16, and a passbook processing device 17.

The control device 11 generally controls an operation of each device included in the ATM 1. The communication device 12 communicates with a device connected to the ATM via a network. For example, the communication device 12 communicates with a server device managed by a bank or the like. The operation display device 13 is a device such as a touch panel display receiving an operation in accordance with a pressed image or a pressing a keyboard with numeric keys when the image displayed on a display is pressed.

The card processing device 14 processes a cash card used to deposit or withdraw cash using the ATM 1 or a credit card used for payment. For example, the card processing device 14 reads or writes various kinds of information from or to a magnetic storage medium or an integrated circuit (IC) chip attached to a card. The biometric information reading device 15 reads biometric information such as a fingerprint or a vein to execute confirmation of the fingerprint or the vein of a person. The cash processing device 16 processes coins or bank notes. For example, when cash is inserted into the ATM 1, the cash processing device 16 receives the inserted bank notes therein. When cash is discharged from the ATM, the cash processing device 16 discharges an amount of cash therefrom as instructed by a user of the card.

The passbook processing device 17 processes the passbook 2. For example, when the passbook 2 is inserted into a document receptacle (e.g., an insertion port of the ATM 1), the passbook processing device 17 transports the passbook 2 to a reading position at which registration position information stored in the magnetic stripe 3 is read. When the passbook 2 is transported to the reading position, the passbook processing device 17 reads the registration position information from the magnetic stripe 3 included in the passbook 2. The passbook processing device 17 executes registering, i.e., printing, of information at a registration position subsequent to the previous registration, i.e., printed, position indicated by the registration position information. That is, the passbook processing device 17 executes registering on a line subsequent to the line containing the most recent previously registered information. When the most previously registered line is the final line of a page, the passbook processing device 17 executes registering on the beginning line of a subsequent page. Then, the passbook processing device 17 updates the registration position information stored in the magnetic stripe 3 to the position in the passbook where it has just registered information.

Next, a hardware configuration of the passbook processing device 17 will be described.

FIG. 2 is a block diagram illustrating an example of a hardware configuration of the passbook processing device 17. The passbook processing device 17 includes a control unit 700, a connection interface 704, a passbook transport unit 705, a sensor 706, a magnetic head transport unit 707, a magnetic head 708, a page feeding unit 709, and a printing unit 710. These units are connected to each other via a system bus 711 such as a data bus or an address bus.

The control unit 700 is a computer that controls an operation of the entire passbook processing device 17 and executes various functions provided by the passbook processing device 17. The control unit 700 includes a central processing unit (CPU) 701, a read-only memory (ROM) 702, and a random access memory (RAM) 703.

The CPU 701 generally controls an operation of the passbook processing device 17.

The ROM 702 is a storage medium in which a semiconductor memory or the like is used. The ROM 702 stores a control program 712, a reading position setting 713, and a writing position setting 714. The control program 712 is a program that realizes a function provided by an operating system or the passbook processing device 17. The control program 712 contains a program realizing functions according to the embodiment.

The reading position setting 713 is information for setting a plurality of reading positions indicating positions on the magnetic stripe 3 from which the registration position information is read. At the reading position on the magnetic stripe 3, a starting point at which coordinates of a vertical direction and a horizontal direction in which reading starts are set and an ending point at which coordinates of a vertical direction and a horizontal direction in which the reading ends are set. The magnetic head 708 reads the magnetic stripe 3 from the starting point to the ending point of the reading position while being transported in the longitudinal direction of the magnetic stripe 3 by the magnetic head transport unit 707. The magnetic head 708 can be moved to read a substantially entire region on the magnetic stripe 3 to read the plurality of reading positions set in the reading position setting 713.

The writing position setting 714 is information for setting a writing position indicating a position at which the registration position information of the currently being performed transaction is to be written on the magnetic stripe 3. The writing position is information for setting a starting point at which coordinates of a vertical direction and a horizontal direction in which writing starts, and an ending point at which coordinates of a vertical direction and a horizontal direction in which the writing ends, on the magnetic stripe 3. As during reading, the magnetic head 708 writes registration position information from the starting point to the ending point of a writing position on the magnetic stripe 3 while being transported in the longitudinal direction of the magnetic stripe 3 by the magnetic head transport unit 707. The control program 712, the reading position setting 713, and the writing position setting 714 may be stored in a storage medium other than the ROM 702. Further, the reading position setting 713 and the writing position setting 714 may be changeable arbitrarily when stored in a rewritable storage medium.

The RAM 703 is a storage medium that temporarily stores various programs or stores various kinds of data to be overwritten therein. The CPU 701 executes a program stored in the ROM 702 or the like using the RAM 703 as a work area. The CPU 701 uses a part of a region or the entire region of the RAM 703 as a region for storing a registration position information table 715.

FIG. 3 is an explanatory diagram illustrating an example of a data configuration of the registration position information table 715. The registration position information table 715 is an information table in which the registration position information indicating a registered, i.e., previously written to, registration position is stored at each reading position of the magnetic stripe 3. In the registration position information table 715, a reading position, date information, page position information, and line position information are stored as the registration position information in association with each other. The reading position is information indicating a reading position of the magnetic stripe 3 from which the registration position information may be read from the passbook. The date information is information indicating the date information was registered, i.e., printed, on the passbook. The page position information is information indicating the number of pages of information which are registered in the passbook 2. The line position information is information indicating the number of the line on the last page on which information was registered on the passbook 2.

Referring back to FIG. 2, the connection interface 704 is an interface that communicates with another device of the ATM 1. For example, the connection interface 704 is an interface that communicates with the control device 11.

The passbook transport unit 705 is a mechanism that transports the passbook 2 within the ATM 1. For example, the passbook transport unit 705 receives the passbook 2 inserted into the insertion port. Then, the passbook transport unit 705 transports the passbook 2 to a reading position or a writing position of the ATM.

The sensor 706 detects that the passbook 2 is located at a predetermined position. For example, the sensor 706 detects that the passbook 2 has been transported to a reading position or a writing position by detecting that a lower end of the passbook 2 is located at a predetermined position. The end of the passbook 2 detected by the sensor 706 may be an upper end of the passbook 2, a right side of the passbook 2, or a left side of the passbook 2. Further, the sensor 706 may detect an end of the magnetic stripe 3 of the passbook 2.

The magnetic head transport unit 707 is a mechanism that transports the magnetic head 708. For example, the magnetic head transport unit 707 transports the magnetic head 708 in the longitudinal, i.e., length, direction of the magnetic stripe 3 by using a motor and belt, or the like (not shown).

The magnetic head 708 reads various kinds of information stored on the magnetic stripe 3 by detecting a direction of a magnetic field on or in the magnetic stripe 3. The magnetic head 708 writes various kinds of information onto or into the magnetic stripe 3 by generating a magnetic field and therewith magnetizing the magnetic stripe 3 in a desired direction. Further, the magnetic head 708 has a width in a transport direction with respect to the magnetic head transport unit 707. Accordingly, the magnetic head 708 can execute reading or writing on a region equal to the width of the magnetic head 708 in a direction orthogonal to the longitudinal direction of the magnetic stripe 3.

The page feeding unit 709 is a mechanism that feeds (turns) a page of the passbook 2.

The printing unit 710 is a printer that registers, i.e., prints, information into the passbook 2.

Next, an overall structure of the passbook processing device 17 related to reading and writing from or to the magnetic stripe 3 will be described.

FIG. 4 is an explanatory diagram schematically illustrating an overall structure of the passbook processing device 17. First, reading of the magnetic stripe 3 will be described. The passbook transport unit 705 transports the passbook 2 to a reading position in the Y direction. That is, the passbook transport unit 705 transports the passbook 2 to a position at which the magnetic head 708 is close to the reading position of the magnetic stripe 3. When the passbook transport unit 705 transports the passbook 2 to the reading position, the magnetic head transport unit 707 transports the magnetic head 708 in the X direction. At this time, the magnetic head 708 reads information stored on or in the magnetic stripe 3 at the reading position. Then, the passbook processing device 17 executes this process at each reading position set in the reading position setting 713.

Next, writing on or to the magnetic stripe 3 will be described. The passbook transport unit 705 transports the passbook 2 to a writing position in the Y direction. That is, the passbook transport unit 705 transports the passbook 2 to a position at which the magnetic head 708 is close to the writing position of the magnetic stripe 3. When the passbook transport unit 705 transports the passbook 2 to the writing position, the magnetic head transport unit 707 transports the magnetic head 708 in the X direction. At this time, the magnetic head 708 writes information on or to the magnetic stripe 3 at the writing position.

Figure 5:
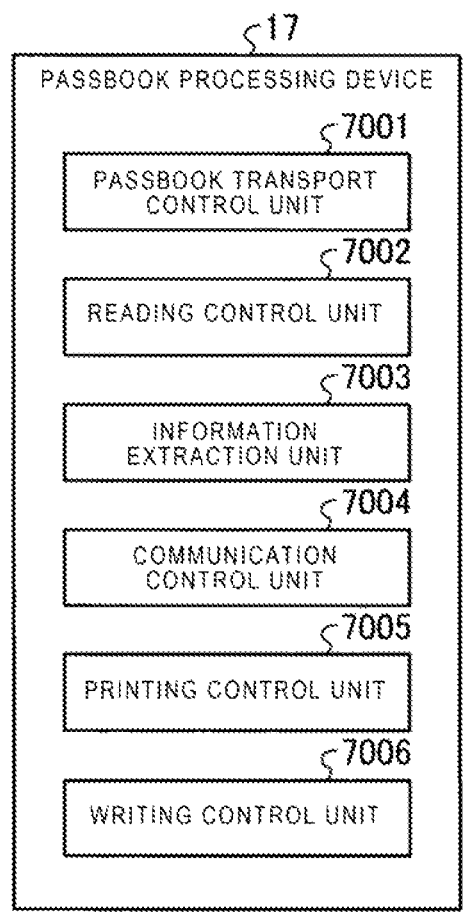
FIG. 5 is a block diagram illustrating an example of a characteristic function configuration of the passbook processing device.

Next, characteristic functions of the passbook processing device 17 will be described. Here, FIG. 5 is a block diagram illustrating an example of a characteristic function configuration of the passbook processing device 17.

The CPU 701 of the passbook processing device 17 generates each functional unit in the RAM 703 by loading the control program 712 stored in the ROM 702 to the RAM 703 and operating in accordance with the control program 712. Specifically, the control unit 700 of the passbook processing device 17 includes a passbook transport control unit 7001, a reading control unit 7002, an information extraction unit 7003, a communication control unit 7004, a printing control unit 7005, and a writing control unit 7006 as functional units.

The passbook transport control unit 7001 is an example of a reception unit and a changing unit. The passbook transport control unit 7001 controls the passbook transport unit 705 and the sensor 706 such that the passbook 2 is transported. For example, the passbook transport control unit 7001 receives the passbook 2 inserted into the insertion port. Then, the passbook transport control unit 7001 controls the passbook transport unit 705 based on detection result of the sensor 706 such that the passbook 2 is transmitted to a reading position. The passbook transport control unit 7001 transports the passbook 2 to a subsequent reading position when the reading of the magnetic stripe 3 is completed. The passbook transport control unit 7001 transports the passbook 2 to a registration position at which the passbook 2 is registered with the transaction information when the reading position is changed in this way and the reading at all the reading positions set in the reading position setting 713 is completed. Further, when the registering is completed, the passbook transport control unit 7001 controls the passbook transport unit 705 based on a detection result of the sensor 706 such that the passbook 2 is transported to a writing position of the writing position setting 714.

The reading control unit 7002 controls the magnetic head 708, the magnetic head transport unit 707, and the like such that the registration position information stored on the magnetic stripe 3 is read. For example, when the passbook transport control unit 7001 transports the passbook 2 to a reading position, the reading control unit 7002 causes the magnetic head transport unit 707 to transport the magnetic head 708 in a direction orthogonal to the transport direction of the passbook 2. That is, the reading control unit 7002 causes the magnetic head transport unit 707 to transport the magnetic head 708 in the longitudinal direction of the magnetic stripe 3. At this time, the reading control unit 7002 causes the magnetic head 708 to read the registration position information stored in the magnetic stripe 3.

Here, FIG. 6 is an explanatory diagram illustrating reading of the magnetic stripe 3 of the related art. FIG. 7 is an explanatory diagram illustrating reading of a magnetic stripe 3 according to the embodiment. A position at which the registration position information is written on the magnetic stripe 3 is regulated in conformity to a standard or the like. Accordingly, the registration position information is intended to be overwritten each time the magnetic stripe is read. However, the registration position information is written at a different position from the intended to be written position due to various reasons such as a fault and setting failure in some cases. Due to such a reason, the magnetic stripe 3 illustrated in FIGS. 6 and 7 indicates a state in which registration position information of the registration before the last previous registration and registration position information of previous registration are both stored. A round mark on a reading position illustrated in FIGS. 6 and 7 indicates the starting point of reading of the stripe. An "x" mark indicates an ending point of reading of the stripe.

Originally, since the registration position information of the previous registration is written at the position of registration position information of the registration position before last, the magnetic head 708 can read the registration position information of the previous registration by reading the registration position information from the reading position illustrated in FIG. 6. However, since the registration position information of the previous registration is written at a different position from the intended original position and thus did not overwrite the registration information registered before it, the magnetic head 708 may read the registration position information of the registration prior to the most recent prior registration. Therefore, the printing unit 710 may execute registration, i.e., printing, of information at a subsequent position indicated by the registration position information of the registration prior to the most recent past registration. That is, the printing unit 710 may execute duplicate printing at the previously registered position, because it steps one line from the read prior registration location when printing the registration information in the passbook.

However, according to the embodiment, based on the reading position setting 713, the passbook transport control unit 7001 transports the passbook 2 to a reading position. Then, when the passbook transport control unit 7001 transports the passbook 2 to the reading position, the reading control unit 7002 reads information written at reading position 1 illustrated in FIG. 7. Here, since the magnetic head 708 has a width in the Y direction, the magnetic head 708 reads information written in a region of the width of the magnetic head 708 centering on reading position 1. The reading control unit 7002 stores the read information in the registration position information table 715. Then, the passbook transport control unit 7001 and the reading control unit 7002 executes the same process at each position from reading position 2 to reading position 5 set in the reading position setting 713 while moving the passbook 2 in the Y direction and changing the reading position. Thus, the reading control unit 7002 reads empty information from reading position 1 illustrated in FIG. 7, reads the previous registration position information from reading position 2 and reading position 3, and reads the registration position information from before the last from reading position 4 and reading position 5.

The reading control unit 7002 stores one piece of registration position information or the plurality of pieces of registration position information read from the magnetic stripe 3 in the registration position information table 715. For example, for the magnetic stripe 3 illustrated in FIG. 7, the reading control unit 7002 stores the empty information, the registration position information before last, i.e., the registration information from the registration prior to the most recent previous registration, and the previous registration position information in the registration position information table 715. FIG. 7 illustrates the use of five reading positions set in the reading position setting 713, but the number of reading positions is not limited thereto. For example, the number of reading positions set in the reading position setting 713 may be 4 or less or may be 6 or more.

A length of an interval or gap of the reading positions in the Y direction set in the reading position setting 713 is preferably sub-units of regions otherwise readable at one time, i.e., by one pass over the magnetic stripe 3, by the magnetic head 708. Thus, even when the reading control unit 7002 transports the magnetic head 708 in the Y direction to perform a second or subsequent reading of the magnetic stripe 3, a part of the currently read region overlaps with a previously read region. Accordingly, the reading control unit 7002 can reduce a reading omission of the correct registration position information stored on the magnetic stripe 3.

The information extraction unit 7003 is an example of an extraction unit. The information extraction unit 7003 extracts the registration position information indicating the previously registered position from a reading result of the magnetic stripe 3 stored in the registration position information table 715. For example, the information extraction unit 7003 extracts the registration position information based on date information in each piece of registration position information stored in the registration position information table 715. That is, the information extraction unit 7003 extracts the registration position information, from among those read, in which the registration date is the most recent.

The communication control unit 7004 is an example of an output unit. The communication control unit 7004 controls the connection interface 704 such that the communication control unit 7004 communicates with another device such as the control device 11 included in the ATM 1. For example, the communication control unit 7004 transmits the registration position information indicating the previously registered position of transaction information extracted by the information extraction unit 7003 to the control device 11 or the like. Thus, the communication control unit 7004 outputs the registration position information extracted by the information extraction unit 7003. The communication control unit 7004 receives the registration information from the control device 11 or the like. The registration information is information containing registration content information, i.e., transaction information, balance information, etc., indicating content to be registered on the passbook 2 and registration position information indicating a position at which the content is to be registered.

The printing control unit 7005 controls the page feeding unit 709 and the printing unit 710 such that registering by printing into the passbook 2 is executed on the passbook 2. For example, the printing control unit 7005 controls the page feeding unit 709 such that the page feeding unit 709 turns pages of the passbook 2 to a page indicated by the registration position information contained in the registration information. Then, the printing control unit 7005 controls the printing unit 710 such that the printing control unit 7005 prints the registration content information contained in the registration information into a line indicated by the registration position information of the page indicated by the registration position information.

The writing control unit 7006 is an example of a writing unit. The writing control unit 7006 controls the magnetic head 708, the magnetic head transport unit 707, and the like such that the registration position information for the just registered, or to be registered, information is written on the magnetic stripe 3. For example, when the passbook transport control unit 7001 transports the passbook 2 to a writing position, the writing control unit 7006 causes the magnetic head transport unit 707 to transport the magnetic head 708 in the direction orthogonal to the transport direction of the passbook 2. That is, the writing control unit 7006 causes the magnetic head transport unit 707 to transport the magnetic head 708 in the longitudinal direction of the magnetic stripe 3. At this time, the writing control unit 7006 causes the magnetic head 708 to write the registration position information on the magnetic stripe 3. That is, the writing control unit 7006 causes the magnetic head 708 to write the date information, the page position information, and the line position information of the information being registered in the current transaction into the magnetic stripe 3.

The writing control unit 7006 may initialize the magnetic stripe 3 in cooperation with the passbook transport control unit 7001 before the registration position information is written on the magnetic stripe 3. That is, the writing control unit 7006 may write an initial value such as zero onto the magnetic stripe 3 before writing the registration position information thereon or therein. Further, the writing control unit 7006 may initialize the entire magnetic stripe 3, such as the portion of the magnetic stripe where the registration position information before last is written. More specifically, the passbook transport control unit 7001 transports the passbook 2 to a spot according to a position of the magnetic stripe 3 to be initialized. Then, the writing control unit 7006 writes the initialization value when causing the magnetic head transport unit 707 to transport the magnetic head 708 in the direction orthogonal to the transport direction of the passbook 2. The passbook transport control unit 7001 and the writing control unit 7006 initialize the magnetic stripe 3 by repeatedly executing this process according to a region of the magnetic stripe 3 to be initialized.

Figure 8:
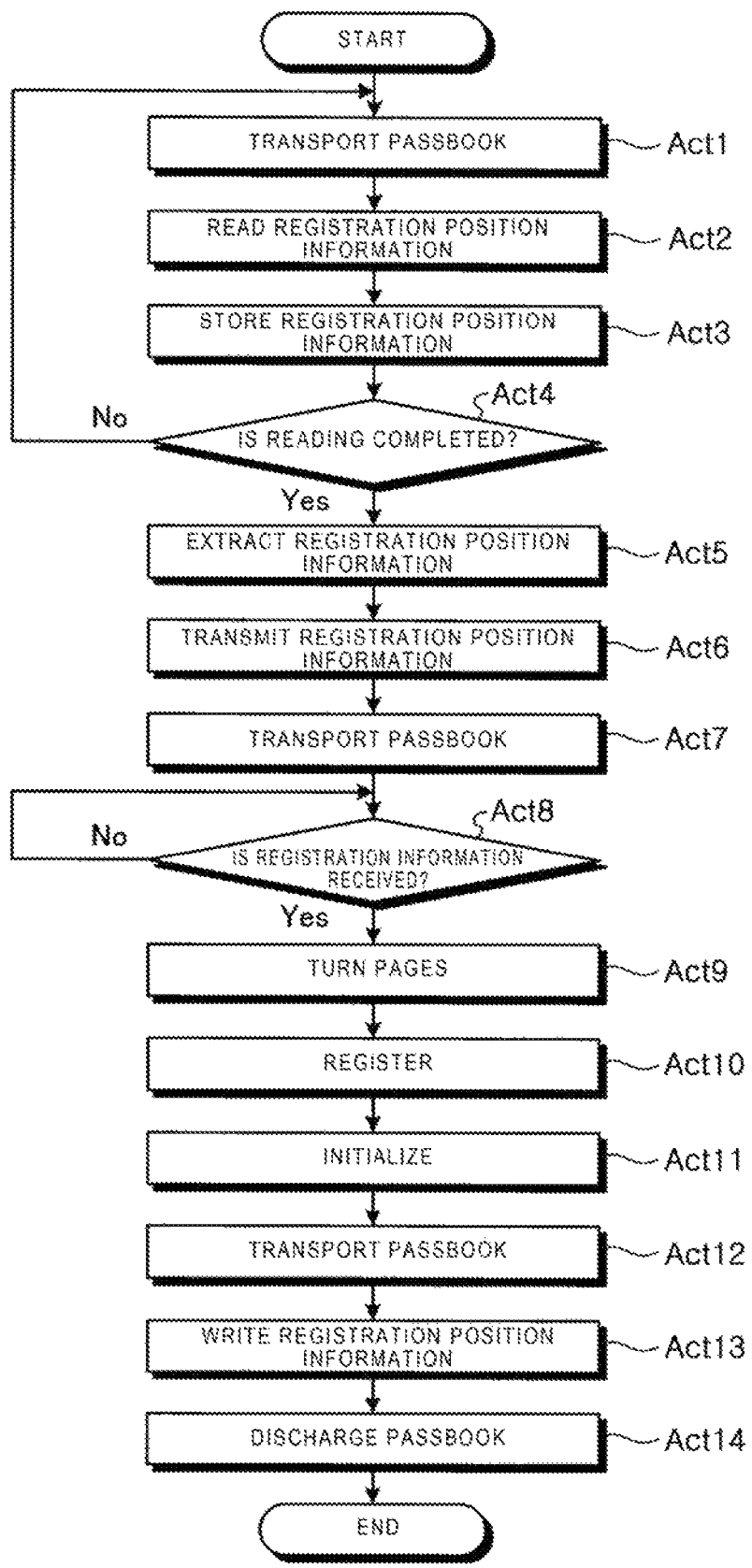
FIG. 8 is a flowchart illustrating an example of registering.

Next, registering of registered information position information executed by the passbook processing device 17 is described. Here, FIG. 8 is a flowchart illustrating an example of the registering executed by the passbook processing device 17 according to the embodiment.

The passbook transport control unit 7001 transports the passbook 2 to a reading position set in the reading position setting 713 (Act 1).

The reading control unit 7002 reads the registration position information stored in the magnetic stripe 3 while causing the magnetic head transport unit 707 to transport the magnetic head 708 (Act 2). The reading control unit 7002 stores the read registration position information in the registration position information table 715 (Act 3).

The reading control unit 7002 determines whether the reading from all the plurality of reading positions set in the reading position setting 713 is completed (Act 4). When the reading from all the reading positions is not completed (No in Act 4), the process proceeds to Act 1 and the passbook transport control unit 7001 transports the passbook 2 to a reading position at which the reading is not yet executed.

Conversely, when that the reading from all the reading positions is completed (Yes in Act 4), the information extraction unit 7003 extracts the registration position information indicating the previously registered position from the registration position information table 715 (Act 5).

The communication control unit 7004 transmits the extracted registration position information to the control device 11 (Act 6). The passbook transport control unit 7001 transports the passbook 2 to a position at which registering of the transaction information is to be executed, i.e., printed, on the next line of the passbook 2 (Act 7). The communication control unit 7004 waits until the registration information is received (No in Act 8).

Under the condition that the registration information is received (Yes in Act 8), the printing control unit 7005 turns pages of the passbook 2 to a page indicated by the registration position information contained in the registration information (Act 9). The printing control unit 7005 prints the content of the registration content information contained in the registration information on the passbook 2 (Act 10). That is, the printing control unit 7005 executes registering of the content information in or on the passbook 2.

The writing control unit 7006 initializes the magnetic stripe 3 (Act 11).

The passbook transport control unit 7001 transports the passbook 2 to a writing position set in the writing position setting 714 (Act 12). The writing control unit 7006 writes the registration position information on the magnetic stripe 3 while causing the magnetic head transport unit 707 to transport the magnetic head 708 along the magnetic stripe 3 (Act 13).

The passbook transport control unit 7001 then discharges the passbook 2 from the ATM 1 (Act 14).

The passbook processing device 17 then ends the foregoing registering operation.

As described above, in the passbook processing device 17 according to the embodiment, the reading control unit 7002 reads a plurality of regions of the magnetic stripe 3 based on the setting of the reading position setting 713. The reading control unit 7002 stores the registration position information read from the plurality of regions of the magnetic stripe 3 in the registration position information table 715. The information extraction unit 7003 extracts the registration position information indicating the previously registered position from the registration position information table 715, based on the dates of the read registration position information. Then, the communication control unit 7004 transmits the registration position information indicating the most recently registered position to the control device 11 or the like. That is, even when the magnetic stripe 3 stores a plurality of different pieces of registration position information, the passbook processing device 17 transmits the registration position information indicating the previous registration position, i.e., the most recent printed line location, to the control device 11 or the like. Accordingly, the passbook processing device 17 can prevent registering of information into the passbook from being executed at a wrong position therein.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein maybe made without departing from the spirit of the inventions. The accompanying claims and their equivalents are intended to cover such forms or modifications as would fall within the scope and spirit of the inventions.

For example, in the foregoing embodiments, as described above, the information extraction unit 7003 extracts the registration position information indicating the previously registered position based on a date of the registration position in the information table 715. However, the method of extracting the registration position information indicating the previously registered position is not limited thereto. Here, the printing control unit 7005 executes registering by printing on the upper end of a page starting from the smallest page number of the number of pages, and the unprinted line closest to the top of that page, of the passbook 2. That is, the previously registered position is the lowest line of a largest page number of the number of pages among the pages on which information has been registered, or the first line of a subsequent page where the most recent registration was printed on the last line of a page. Accordingly, the information extraction unit 7003 may extract the registration position information indicating the previously registered position based on the page position information and the line position information of the registration position information table 715.

In the foregoing embodiments, as described above, the passbook transport control unit 7001 transports the passbook 2 to a position set in the reading position setting 713 and the writing position setting 714. Then, as described above, the reading control unit 7002 and the writing control unit 7006 read and write the registration position information. However, the reading control unit 7002 and the writing control unit 7006 may cause the magnetic head transport unit 707 to transport the magnetic head 708 to a position set in the reading position setting 713 and the writing position setting 714.

A program executed in each device according to the foregoing embodiments and modification examples is embedded in advance in a storage medium (a ROM or a storage unit) included in each device to be provided, but an exemplary embodiment is not limited thereto. For example, the program may be configured to be written in a file with an installable format or an executable format on a computer-readable recording medium such as a CD-ROM, a flexible disc (FD), a CD-R, a digital versatile disk (DVD) to be provided. Further, the storage medium is not limited to a medium independent from a computer or an embedded system, but also includes a storage medium on which a program delivered via a LAN, the Internet, or the like is downloaded to be stored or temporarily stored.

The program executed in each device according to the foregoing embodiments and modification examples may be stored on a computer connected to a network such as the Internet and maybe downloaded via the network to be provided or maybe provided or distributed via a network such as the Internet.

What is claimed is:

1. A magnetic information processing apparatus for registering transaction information on a line in a document and storing a location of the line in magnetic media attached to the document, comprising:
   a magnetic head configured to read information across a width thereof;
   a document receptacle configured to receive the document on which the magnetic media storing a position where immediately previous transaction information is registered is attached; and
   a processing unit programmed to:
      control the magnetic head to move across the magnetic media and scan a first path across the magnetic media in a first direction to read registration location information from a first position of the magnetic media, move across the magnetic media in a second direction by a distance less than the width of the magnetic head, and then move across the magnetic media in the first direction to read registration location information from a second position of the magnetic media;
      extract registration position information indicating a location of a most recent registration position from a result of reading of the first and second positions of the magnetic media by the magnetic head; and
      output the extracted registration position information.

2. The apparatus according to claim 1, wherein the second direction is the width direction of the magnetic head.

3. The apparatus according to claim 2, wherein the registration location information includes a date on which the registration location information was previously written onto the magnetic media.

4. The apparatus according to claim 3, wherein the processing unit is further programmed to continue controlling the magnetic head to move across the magnetic media in the second direction by a distance less than the width of the magnetic head, and move across the media in the first direction to read registration location information from the magnetic media after reading registration information from the second position of the magnetic media, until the magnetic head scans over a region of the magnetic media in the first direction and resulting read information does not contain registration location information.

5. The apparatus according to claim 4, wherein the processing unit is further programmed to,
   in response to receipt of new registration information by a reception unit:
   determine a date of each item of registration location information read by the magnetic head;
   extract a registration location of only a most recent registration location from the registration location information read by the magnetic head; and
   control the magnetic head to write a location at which the new registration information is, or will be, registered in the document over the most recent registration position stored in the magnetic media.

6. The apparatus according to claim 5, further comprising a registration section, wherein the registration section registers the new registration information in the document.

7. The apparatus according to claim 6, wherein the registration section comprises a printer and the document is a passbook related to an account.

8. A magnetic information processing apparatus comprising:
   a magnetic head;
   a receptacle configured to receive a passbook to which a magnetic stripe storing a previous registration position is attached; and
   a control unit configured to:
      cause the magnetic head to move across the magnetic stripe in a first path and read magnetic information from the magnetic stripe using the magnetic head, and then to move across the magnetic stripe in a second path and read magnetic information from the magnetic stripe using the magnetic head, wherein a portion of the first path overlaps a portion of the second path;
      extract registration position information for a most recent registration from a reading result of reading the magnetic information by the magnetic head, the registration position information including a date when the registration position information was recorded in the magnetic stripe; and
      output the extracted registration position information.

9. The apparatus according to claim 8, further comprising:
   a printer configured to print new registration information into the passbook at a location in the passbook adjacent to, and not overlapping, a location of most recent registration information.

10. The apparatus according to claim 8, wherein the position on the magnetic stripe read by the magnetic head is changed based on a plurality of reading position settings set in units of regions readable by the magnetic head in a single pass over the magnetic stripe.

11. The apparatus according to claim 8, wherein the control unit is further configured to cause the magnetic head to move across the magnetic stripe in one or more additional paths which overlap in part with a previous path of the magnetic head, if registration information is read while moving the magnetic head along the path; and
   the control unit extracts the registration position information indicating a most recent previously registered position of registration information in the passbook based on information indicating a date of registration of registration information into the passbook included in the registration position information.

12. The apparatus according to claim 11, wherein the control unit extracts the registration position information for the most recent registration from among registration positions read by the magnetic head.

13. The apparatus according to claim 8, wherein the control unit is further configured to cause the magnetic head to write an initialization value onto the magnetic stripe.

14. A magnetic information processing apparatus comprising:
   a magnetic head;
   a receptacle configured to receive a passbook to which a magnetic stripe storing a previous registration position is attached; and
   a control unit configured to:
      cause the magnetic head to move across the magnetic stripe in a first path and read magnetic information from the magnetic stripe using the magnetic head, and then to move across the magnetic stripe in a second path and read magnetic information from the magnetic stripe using the magnetic head, wherein a portion of the first path overlaps a portion of the second path, and a position on the magnetic stripe read by the magnetic head is changed based on a plurality of reading position settings set in units of regions readable by the magnetic head in a single pass over the magnetic stripe;
      extract registration position information for a previous registration from a reading result of reading the magnetic information by the magnetic head; and
      output the extracted registration position information.

15. The apparatus according to claim 14, wherein further comprising:
   a printer configured to print new registration information into the passbook at a location in the passbook adjacent to, and not overlapping, a location of most recent registration information.

16. The apparatus according to claim 14, wherein the control unit is further configured to cause the magnetic head to move across the magnetic stripe in one or more additional paths which overlap in part with a previous path of the magnetic head, if registration information is read while moving the magnetic head along the path; and
   the control unit extracts the registration position information indicating a most recent previously registered position of registration information in the passbook based on information indicating a date of registration of registration information into the passbook included in the registration position information.

17. The apparatus according to claim 16, wherein the control unit extracts the registration position information for a most recent registration from among registration positions read by the magnetic head.

18. The apparatus according to claim 14, wherein the control unit is further configured to cause the magnetic head to write an initialization value onto the magnetic stripe.

* * * * *